J. WOODALL.
AUTOMOBILE TIRE.
APPLICATION FILED MAY 3, 1917.
1,279,207.
Patented Sept. 17, 1918.
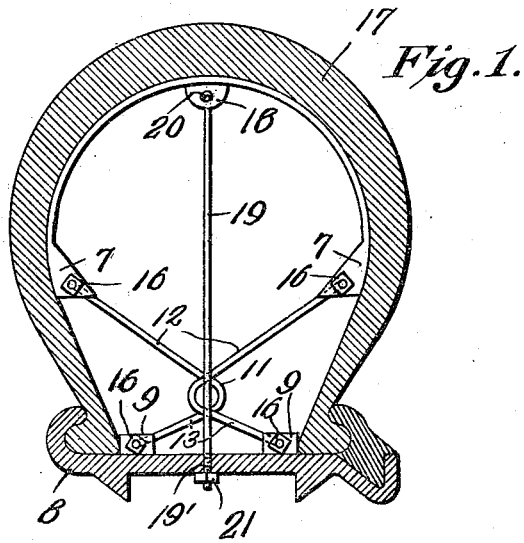
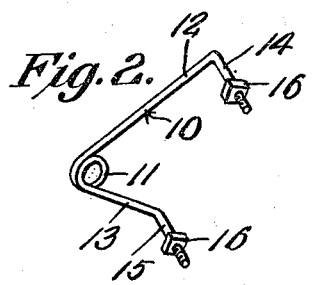
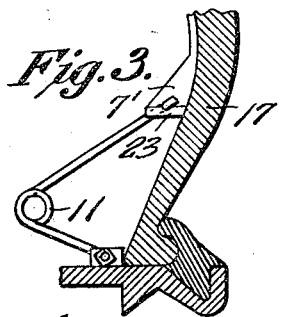
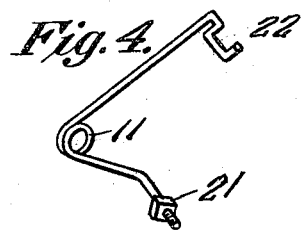
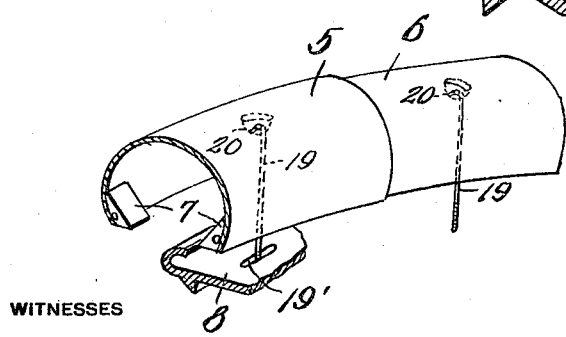
WITNESSES
James F. Crown,
Ray L. Grogan
INVENTOR
Jesse Woodall,
BY Richard B. Owen,
ATTORNEY

UNITED STATES PATENT OFFICE.

JESSE WOODALL, OF WINCHESTER, ILLINOIS.

AUTOMOBILE-TIRE.

1,279,207.   Specification of Letters Patent.   Patented Sept. 17, 1918.

Application filed May 3, 1917. Serial No. 166,207.

*To all whom it may concern:*

Be it known that I, JESSE WOODALL, a citizen of the United States, residing at Winchester, in the county of Scott and State of Illinois, have invented certain new and useful Improvements in Automobile-Tires, of which the following is a specification.

My invention relates to automobile tires and the principal object thereof resides in the provision of a tire which will dispense with the pneumatic tubes, used in conjunction with the tires now in use and yet possessing a maximum resiliency.

Another object of the present invention resides in the provision of a tire which will not be subjected to punctures, blowouts and other tire troubles that is experienced with the present day tires and which will be durable and efficient in use.

A further object of the invention is to provide a tire of this character which may be used in conjunction with any type of automobile wheel rim now on the market.

Still another object resides in the provision of an arrangement to be used for the purpose of assembling the parts of my improved tire.

A further general object is to provide a tire having the above features which is simple in construction, consists of few parts which may be readily assembled, and disassembled; and which may be placed on the market and manufactured at a minimum cost.

Other objects and advantages will become apparent during the course of the following description and fully explained therein.

The invention consists of combinations, arrangements and details of construction which will be hereinafter specifically referred to and illustrated in the accompanying drawing, in which:

Figure 1 is a transverse sectional view of my improved tire.

Fig. 2 is a perspective of one of the springs used in the embodiment of the invention illustrated in Fig. 1.

Fig. 3 is a fragmentary sectional view of a modified form of the invention.

Fig. 4 is a perspective of one of the springs used in connection with the embodiment of the invention illustrated in Fig. 3; and Fig. 5 is a perspective of the overlapping plates and illustrating the rods that are used in assembling my improved tire; part of the wheel rim being shown in section.

My improved tire comprises a pair of shoe supporting plates 5 and 6 which are adapted to extend entirely around the wheel rim in spaced relation thereto as will be later set forth. These plates are semi-circular in cross section to give proper shape to the tire, and it will be understood that each plate is curved longitudinally to conform to the wheel rim and is of sufficient length to extend around the rim for a distance slightly greater than one-half the circumference thereof. These plates overlap at each end as shown in Fig. 5 to entirely surround the wheel rim and are provided at their opposite longitudinal edges with one or more perforated lugs 7 adapted to be secured to the wheel rim as will be presently described. The rim, indicated at 8 is provided adjacent its opposite longitudinal edges with lugs 9 adapted to be secured to the lugs 7 through the medium of cushioning springs 10. Each spring 10 is composed of a single length of wire coiled intermediate its ends to provide a spring loop 11 from which the ends of the wire diverge outwardly to provide spring arms 12 and 13. The upper arms 12 of the springs are bent at right angles as indicated at 14 and extended through the lugs 7, being secured by means of nuts 16. The lower arms 13 of the springs are also extended at right angles and indicated at 15 and extended through the lugs 9 of the wheel rim being secured in like manner by nuts 16. These springs are preferably arranged in pairs with the loops 8 of the springs registering with one another at the center of the wheel rim and the arms 12 and 13 of the springs extending toward the side edges of the rims for engagement with the lugs 7 and 9 respectively.

Engaged on the plates 5 and 6 and entirely inclosing the same is a tire shoe or outer casing 17 which has its heels engaged with the rim 8 in the usual manner. It will be manifest that owing to the resiliency of the plates 5 and 6 and the springs 10 the shoe 7 will always be extended, that is to say, the shoe will always be held in the same position that a pneumatic tube would hold it.

Perforated ears 18 are formed upon the plates 5 and 6 at desired points and upon the inner face of these plates at the crest of the same. A rod 19 is provided for each of the ears 18 and has one end bent at right-angles to provide a lug 20 adapted to be engaged with its respective ear 18. Each of these rods 18 is loosely extended through a slot 19' in the rim 8 and has a nut 21 mounted thereon. The purpose of these rods is to draw the plates 5 and 6 toward the rim 8 so that the shoe or casing 17 may be readily placed in position on these plates and engaged with the rim. When the casing or shoe 17 has been placed in position the rods 19 are then disengaged from the ears 18 by simply unloosening the nuts 21 and shifting these rods in the slots 19'.

Figs. 3 and 4 illustrate a modified form of the invention. In this form the outer end of each spring 10 is formed with a substantially U-shaped member 22 which is accommodated in a notch in the ear 7'. A block 23 is secured to the end of the ear 7' having a notch therein and loosely supports the U-shaped member.

This disclosure is merely illustrative and it is to be understood that the forms of the invention herein disclosed may be embodied in many different respects that may be fairly embodied in the scope of the appended claims.

What is claimed is:

1. A wheel including a rim, a pair of plates extending around the rim in spaced relation thereto, said plates being semi-circular in cross section and arranged with the ends thereof overlapping to encircle the rim, lugs extending inwardly from opposite longitudinal edges of said plates, lugs carried by the outer surface of said rim and positioned adjacent opposite edges thereof, and a plurality of springs extending transversely of said rim and forming a resilient connection between the lugs thereon and the lugs carried by said plates.

2. A wheel comprising a rim provided with lugs arranged adjacent opposite longitudinal edges thereof, a pair of plates extending around said rim in spaced relation thereto, said plates being semi-circular in cross section and having their ends overlapping to entirely surround the rim, lugs extending inwardly from oppositely longitudinal edges of said plates for coöperation with the rim lugs, a shoe supported on said plates and secured to said rim, and a plurality of springs resiliently connecting said plates and rim, each of said springs comprising a single length of wire bent intermediate its ends to provide a spring loop, and arms diverging therefrom, said springs being arranged in pairs with the loops thereof registering over the center portion of the rim and the diverging arms thereof detachably connected to the lugs of the plates and the rim lugs respectively.

In testimony whereof I affix my signature in presence of two witnesses.

JESSE WOODALL.

Witnesses:
R. M. RIGGS,
J. M. RIGGS.

Copies of this patent may be obtained for five cents each, by addressing the "Commissioner of Patents, Washington, D. C."